3,169,148
METHOD OF PREPARING ORGANOBORON
COMPOUNDS
Marvin M. Fein, Westfield, and Jack Bobinski, Rockaway, N.J., assignors to Thiokol Chemical Corporation, Bristol, Pa., a corporation of Delaware
No Drawing. Filed Sept. 29, 1960, Ser. No. 59,457
4 Claims. (Cl. 260—606.5)

This invention relates to a method for the preparation of organoboron compounds. The organoboron compounds are prepared by the reaction of a bis(amido) decaborane or a bis(amido) alkydecaborane with an acetylenic hydrocarbon containing from two to ten carbon atoms in the presence of an inert organic solvent. The reaction products prepared by the method of this invention can be either solid or liquid and are useful as fuels.

The preparation of decaborane is known in the art. Lower alkyl decaboranes such as monomethyldecaborane, dimethyldecaborane, monoethyldecaborane, diethyldecaborane, monopropyldecaborane and the like, can be prepared, for example, according to the method described in application Serial No. 497,407, filed March 28, 1955, now U.S. Patent No. 2,999,117, by Elmar R. Altwicker, Alfred B. Garrett, Samuel W. Harris, and Earl A. Weilmuenster.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The liquid products of this invention can be used as fuels according to the method described in the above application Serial No. 497,407, now U.S. Patent No. 2,999,117.

In accordance with this invention, it was discovered that bis(amido) decaboranes or bis(amido) alkyldecaboranes will react with an acetylenic hydrocarbon containing from two to ten carbon atoms in the presence of an inert organic solvent.

Bis(amido) decaboranes and bis(amido) alkldecaboranes can be prepared by the method described in copending application Serial No. 660,987, filed May 22, 1957, of Marvin M. Fein. Suitable bis(amido) decaboranes disclosed in that application include those prepared by reacting decaborane or a lower alkyldecaborane with an amide of the formula:

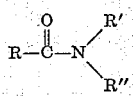

wherein R is a radical selected from the group consisting of hydrogen, lower alkyl and lower alkenyl radicals, and R′ and R″ are radicals selected from the group consisting of hydrogen and lower alkyl radicals. The amide and borane are reacted in a molar ratio of 0.1 to 10:1 and the reaction is preferably carried out in the presence of an inert solvent at a temperature of 0° to 170° C.

Suitable acetylenic hydrocarbons containing two to ten carbon atoms include acetylene, propyne, 1-butyne, 2-butyne, 1-pentyne, etc. and, in addition, acetylenic hydrocarbons which additionally contain one or more ethylenic linkages, such as isopropenyl-acetylene, and 2,5-dimethyl-1,6-hexadiene 3-yne.

Suitable organic solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane, and oxygenated organic solvents such as tetrahydrofuran, ethyl acetate, and diisopropyl ether.

The ratio of reactants can be varied widely, generally being in the range of 0.5 to 2.0 moles of bis(amido) decaborane or bis(amido) alkyldecaborane per mole of acetylenic compound and preferably in the range of 0.6 to 1.0 mole of bis(amido) decaborane or bis(amido) alkyldecaborane per mole of acetylenic compound. The amount of solvent can vary widely but generally ranges up to 50 times the weight of the reactants. The reaction temperatures can vary widely, generally from 50° to 160° C. and preferably from 80° to 110° C. The reaction pressure can vary from subatmospheric to several atmospheres, i.e. from 0.5 to 10 atmospheres, although atmospheric pressure reactions are convenient. The reaction generally requires about 1 to 20 hours, depending upon the ratio of reactants, the particular reactants and solvents employed, and the temperature and pressure of the reaction.

The process of the invention is illustrated in detail by the following examples:

Example I

A mixture of 3.6 g. (0.0125 mol.) of bis(dimethylacetamido)decaborane, 0.8 g. (0.0125 mol.) of isopropenylacetylene and 50 ml. of benzene were placed in a pressure bottle and sealed. The mixture was heated to 80° C. with agitation, for 72 hours. At the end of this time, the sealed bottle was cooled and the contents filtered. The filtrate was evaporated to dryness and 4 g. of a crude liquid product remained, which by infrared examination was predominantly C-isopropenylvinylene decaborate of the formula

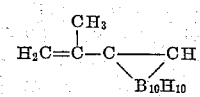

The boron-containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weights of boron containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.20 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the C-isopropylvinylene decaborane, for example, this local fuel to air ratio by weight is approximately 0.081. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operation at these peak temperatures is limited to periods of approximately five minutes at combat conditions in the case of military aircraft. By not permitting operation at higher temperatures and limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the after burner may also occur under these extreme conditions of altitude operations with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-after-burning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this inveniton will improve the combustion process of the ramjet in much the same manner as that described for the after burner because of their improved chemical reactivity over that of simple hydrocarbon fuels. When employed in a ramjet, the liquid fuels of this invention will be simply substituted for hydrocarbon fuels and used in the established manner.

We claim:

1. A method for the preparation of an organoboron compound useful as a fuel which comprises reacting a borane selected from the group consisting of bis(amido) decaboranes and bis(amido) alkyldecaboranes with an acetlyenic hydrocarbon containing from two to ten carbon atoms while the reactants are in admixture with an inert organic solvent, the bis(amido) decaboranes and bis(amido) alkyldecaboranes being the reaction products of a material selected from the group consisting of decaborane and a lower alkyl decaborane with an amide of the formula

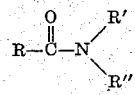

wherein R is a radical selected from the group consisting of hydrogen, lower alkyl and lower alkenyl radicals, and R′ and R″ are radicals selected from the group consisting of hydrogen and lower alkyl radicals.

2. The method of claim 1 wherein the borane is bis-(dimethylacetamido) decaborane.

3. The method of claim 1 wherein the acetylenic hydrocarbon is isopropenyl acetylene.

4. The method of claim 1 wherein the borane is bis-(dimethylacetamido) decaborane and the acetylenic hydrocarbon is isopropenyl acetylene.

No references cited.